Dec. 14, 1954 A. W. METZNER 2,696,671

RECORDING MECHANISM

Filed Aug. 1, 1949 6 Sheets-Sheet 1

INVENTOR
ALBERT W. METZNER
BY Tom Walker
ATTORNEY

Dec. 14, 1954 A. W. METZNER 2,696,671

RECORDING MECHANISM

Filed Aug. 1, 1949 6 Sheets-Sheet 2

INVENTOR
ALBERT W. METZNER
BY Tom Walker
ATTORNEY

Dec. 14, 1954 A. W. METZNER 2,696,671

RECORDING MECHANISM

Filed Aug. 1, 1949 6 Sheets-Sheet 3

INVENTOR
ALBERT W. METZNER
BY Tom Walker
ATTORNEY

Dec. 14, 1954 A. W. METZNER 2,696,671

RECORDING MECHANISM

Filed Aug. 1, 1949 6 Sheets-Sheet 4

INVENTOR
ALBERT W. METZNER
BY Tom Walker
ATTORNEY

Dec. 14, 1954 A. W. METZNER 2,696,671

RECORDING MECHANISM

Filed Aug. 1, 1949 6 Sheets-Sheet 5

INVENTOR
ALBERT W. METZNER
BY Tom Walker
ATTORNEY

Dec. 14, 1954 A. W. METZNER 2,696,671

RECORDING MECHANISM

Filed Aug. 1, 1949 6 Sheets-Sheet 6

INVENTOR
ALBERT W. METZNER
BY Tom Walker
ATTORNEY

United States Patent Office 2,696,671

Patented Dec. 14, 1954

2,696,671

RECORDING MECHANISM

Albert W. Metzner, Dayton, Ohio, assignor to The Standard Register Company, Dayton, Ohio, a corporation of Ohio Application August 1, 1949, Serial No. 108,009

8 Claims. (Cl. 33—23)

The present invention relates to recording mechanism, and more particularly to a mechanism of the autographic register type, in which the indicia upon a superposed assembly of continuous series connected record strips is indirectly recorded thereon from a position remote to the record receiving area of the record forms.

Under certain conditions of use it is highly desirable to protect the record strips both from tampering and surrounding conditions. For example, if the user has dirty or grimy hands it is practically impossible to prevent smudging of the record forms in the usual type of register. Under other conditions, it is necessary or desirable to use a register in locations where such register may be exposed to adverse conditions such as excessive dampness or outside where a register is exposed to the weather. In other applications it is desirable to protect all record forms from unauthorized tampering or alteration, including the topmost or original of the set until such time as the complete transaction has been recorded and the record strips advanced to bring a new form into recording position. The present register has been designed to answer these requirements.

Thus, the object of the present invention is to simplify the construction as well as the means and mode of operation of a recording mechanism, whereby such mechanism may not only be economically manufactured, but will be more efficient and accurate in use, adaptable to a wide variety of uses under widely varying conditions, having relatively few parts and be unlikely to get out of repair.

A further object of the invention is to provide in a recording mechanism a remotely controlled indicia recording instrument.

A further object of the invention is to provide a complete enclosure for at least a portion of the record forms within which enclosure all recording of the desired indicia upon the form takes place.

A further object of the invention is to provide in a recording mechanism of the type described herein a pair of spaced writing tables upon which different sets of forms are located.

A further object of the invention is to provide means in such a mechanism for the duplicate simultaneous recording upon one set of forms the information of indicia recorded upon the other set of forms.

A further object of the invention is to provide upon an enclosed record form the equivalent of an original ink copy without exposure of such form to the handling of the user.

A further object of the invention is to provide a recording mechanism possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In accomplishing the foregoing objects there is contemplated a recording mechanism of the autographic register type in which a plurality of writing tables are provided, at least one of which is exposed for direct use by the user, the other writing tables being completely enclosed with means for locating upon each of the writing tables a form to receive a written record, the record being produced by the operator directly upon the exposed form and simultaneously reproduced upon the form located upon the remotely enclosed writing table, together with the means for so producing at spaced points the desired records.

Referring to the accompanying drawings, wherein is found the preferred but obviously not necessarily the only form of embodiment of the invention, Fig. 1 is a perspective view of a recording mechanism embodying the present invention;

Like parts are indicated by similar characters of reference throughout the several views.

Figures 1, 9:
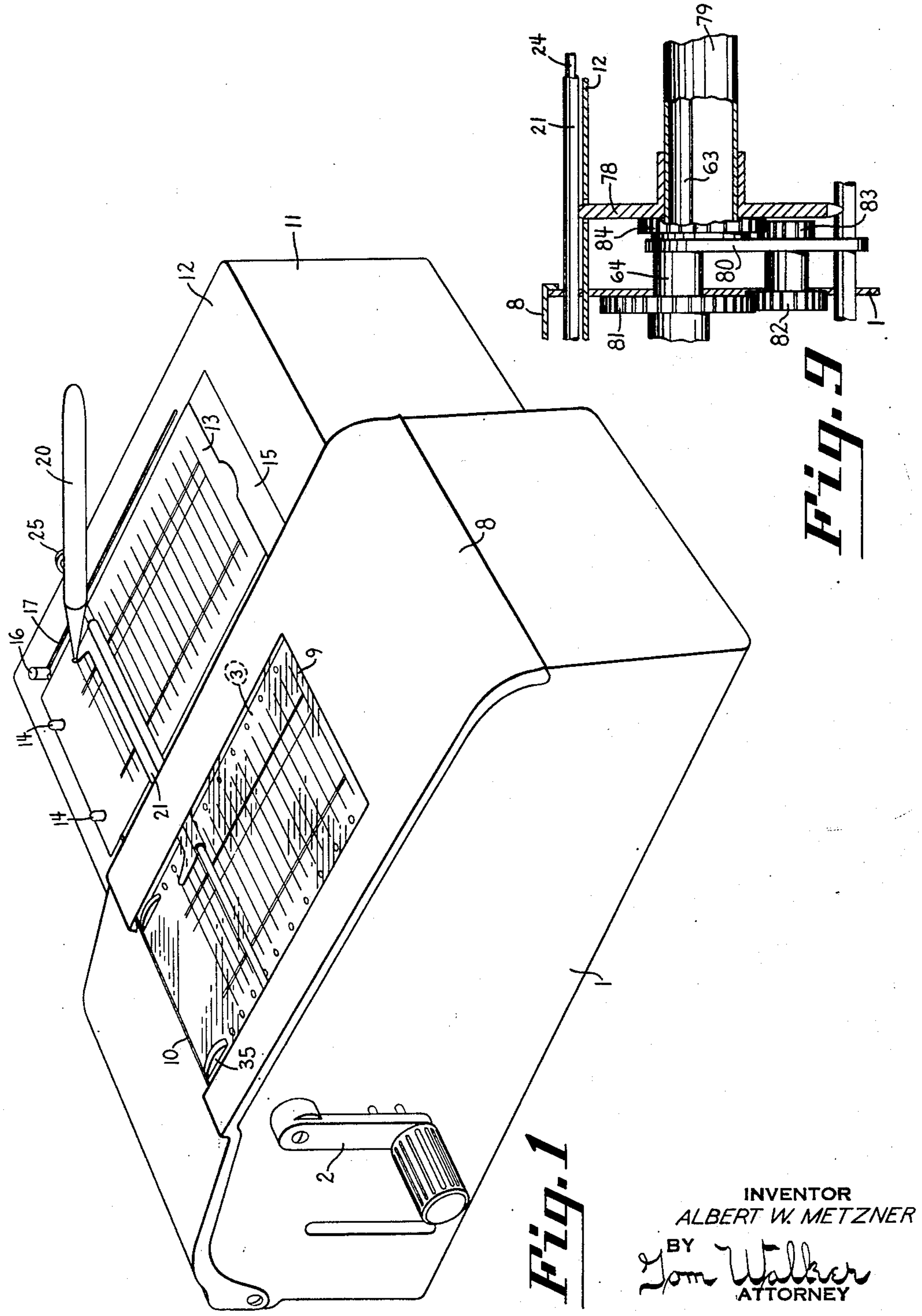
Fig. 9 is a fragmentary view showing a feeding mechanism for the supplemental cabinet.

Referring to the drawings, there is shown in Fig. 1 an autographic register type of recording mechanism embodying the present invention. The strip feeding mechanism, somewhat similar to the usual type of autographic register mechanism is enclosed within a housing 1 and controlled by a hand crank 2, rotation of which ejects an inscribed form from recording position. Superposed continuous strips of series connected detachable forms 3 are progressively advanced past the recording position by the pin wheels 4 under control of the hand crank 2.

The superposed series of strips are advanced from a supply 5 thereof about a guide roller 6 and over a writing table 7. The entire assembly of superposed record strips is enclosed within the cover 8 of the cabinet, the uppermost strip being visible through a transparent portion 9 in the cover. Upon completion of the recording operation and advancement of the series of superposed forms under feeding influence of the pin wheels 4, the uppermost strip is ejected from the enclosed register through a slot 10 located immediately adjacent the leading or front edge of the transparent portion 9.

If found necessary or desirable, the transparent portion 9 may be omitted, the cover 8 being solid thereby preventing visual reading of the inscribed form while still in the register.

Located to the side of the register cabinet 1 is a supplemental cabinet 11, the top surface 12 of which provides a writing table in a common plane with the writing table 7 of the register mechanism. Mounted on the writing table 12 of the supplemental cabinet 11 is a facsimile form 13, corresponding in all respects to the individual forms comprising the superposed strips of series connected forms 3 within the register cabinet 1. The facsimile form 13 is secured in proper position, aligned with the form in recording position within the register 1 by a pair of fixed pins 14, the back or bottom of the facsimile form being held in place by a hinged flap 15 pivotally carried by the supplemental housing 11.

The facsimile form is similar to the presently obtainable pads known as "Magic Slates" comprising a black wax-like base member overlaid with a transparent sheet, usually cellophane or Celluloid. Indicia is made to appear on the Celluloid sheet by application of pressure thereto, the black wax-like base providing a visible marking. To clear or erase such indicia from the overlying sheet it is only necessary to lift such sheet out of engagement with the base. Since it is not practical to lift the overlying sheet of the facsimile form in the present instance, an erasure mechanism is provided.

Mounted for reciprocatory motion upon the cabinet 11 is a knob 16 which travels in a longitudinally disposed slot 17. Fixedly secured to the knob 16 is a laterally projecting strip 18 which extends transversely of the facsimile form intermediate the topmost sheet and underlying base member thereof. The strip 18 is normally maintained in its upper or forward position out of the writing area. To remove or "erase" the indicia inscribed thereon, however, it is only necessary to move the knob 16 and strip 18 rearwardly of the form, thereby separating the top sheet and underlying base members to erase the writing or other indicia recorded thereon.

To record the desired indicia upon the superposed strips of record material 3, a remotely controlled recording implement is provided. Control of such recording instruments is achieved through manual operation of a stylus 20 which is in position to be moved about over the facsimile form 13. The stylus is freely pivoted upon a transversely extending arm 21, the opposite extremity 22 of which overlies the superposed assembly or record strips 3 within the register 1. On the under side of the end 22 is a ball point type pen element 23 which under influence of the pressure and movement imparted to the stylus 20, reproduces a written record upon the uppermost form of the superposed series in the register.

While it is contemplated that the usual manifolding assembly comprising alternating strips of record and transfer material be used in the strip assembly 3, a special strip assembly utilizing transparent record strip for the uppermost copy and a double faced transfer strip therebeneath may be used. Use of such alternate assembly eliminates the necessity for the use of ink in the pen element 23, since the record is reproduced on the under side of the uppermost transparent record strip by the double faced transfer strip therebeneath.

The transverse arm 21 is pivotally mounted upon a carrier rod 24 which extends between and is supported by upstanding ears 25 located adjacent opposite sides of the unit. The ears 25 are integral parts of a trolley unit 26 mounted upon tracks 27 permanently secured to the underside of the common writing tables 7—12. The trolley unit 26 comprises a transverse member 28 interconnecting pairs of rollers 29 which are engageable with the spaced tracks 27 located upon opposite sides of the writing tables.

With such construction it will be seen that the trolley 26 is movable longitudinally of the register, i. e., from heading to bottom of the record forms. The transversely extending arm 21 is of less length than its carrier rod 24, thereby permitting transverse movement of the arm relative to the rod. Such movement of the arm permits movement of the stylus 20 and associated pen 23 from one side of the record forms to the other, while simultaneously permitting movement of the stylus and associated pen longitudinally of the record forms. With such motion it is possible to write upon both the facsimile form 13 and the superposed assembly of record forms 3.

To facilitate replacement of the upper sheet of facsimile form 13, a rod 31 is engaged with the bottom or lower end of such sheet, the rod being supported intermediate a portion of the housing 1 and the track 27 under influence of a spring 32, against the yielding resistance of which the rod may be removed from the register to thereby release the sheet for replacement.

Figure 5:
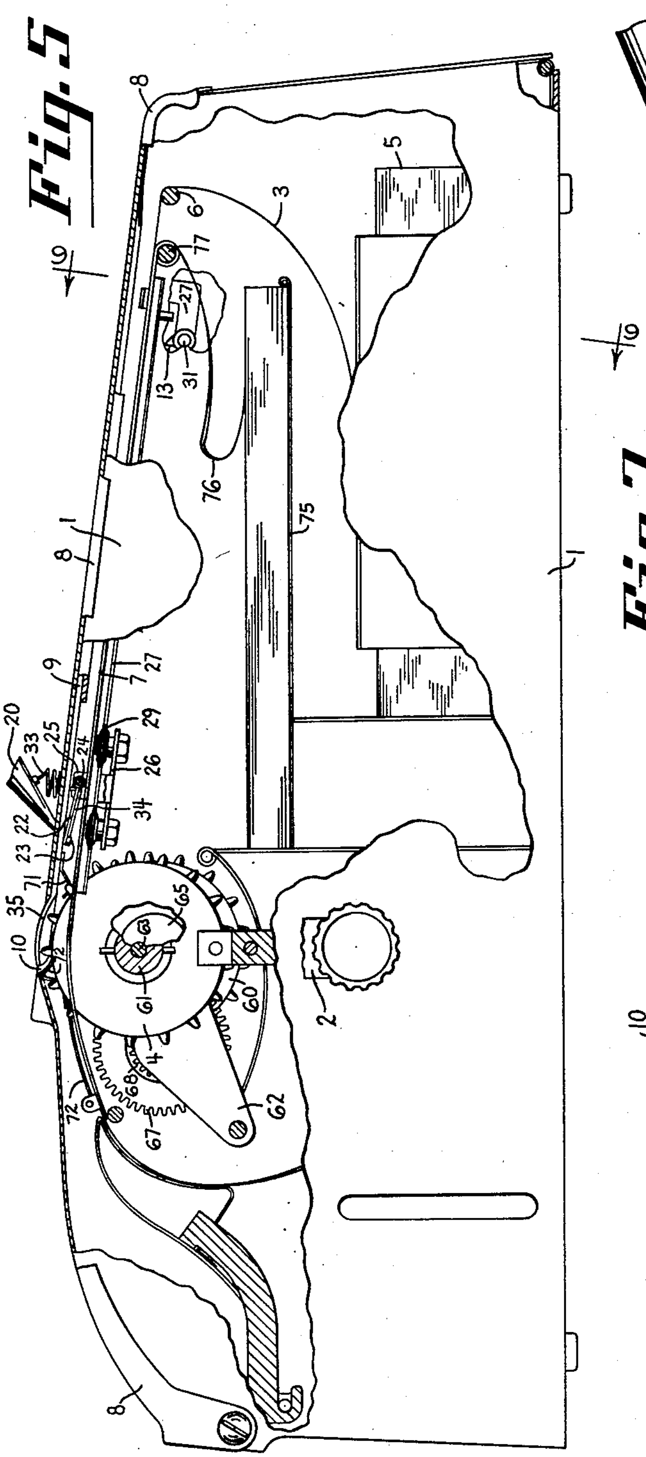
Fig. 5 is a side view, partly in section, showing a register embodying the present invention.
Figures 6, 8:
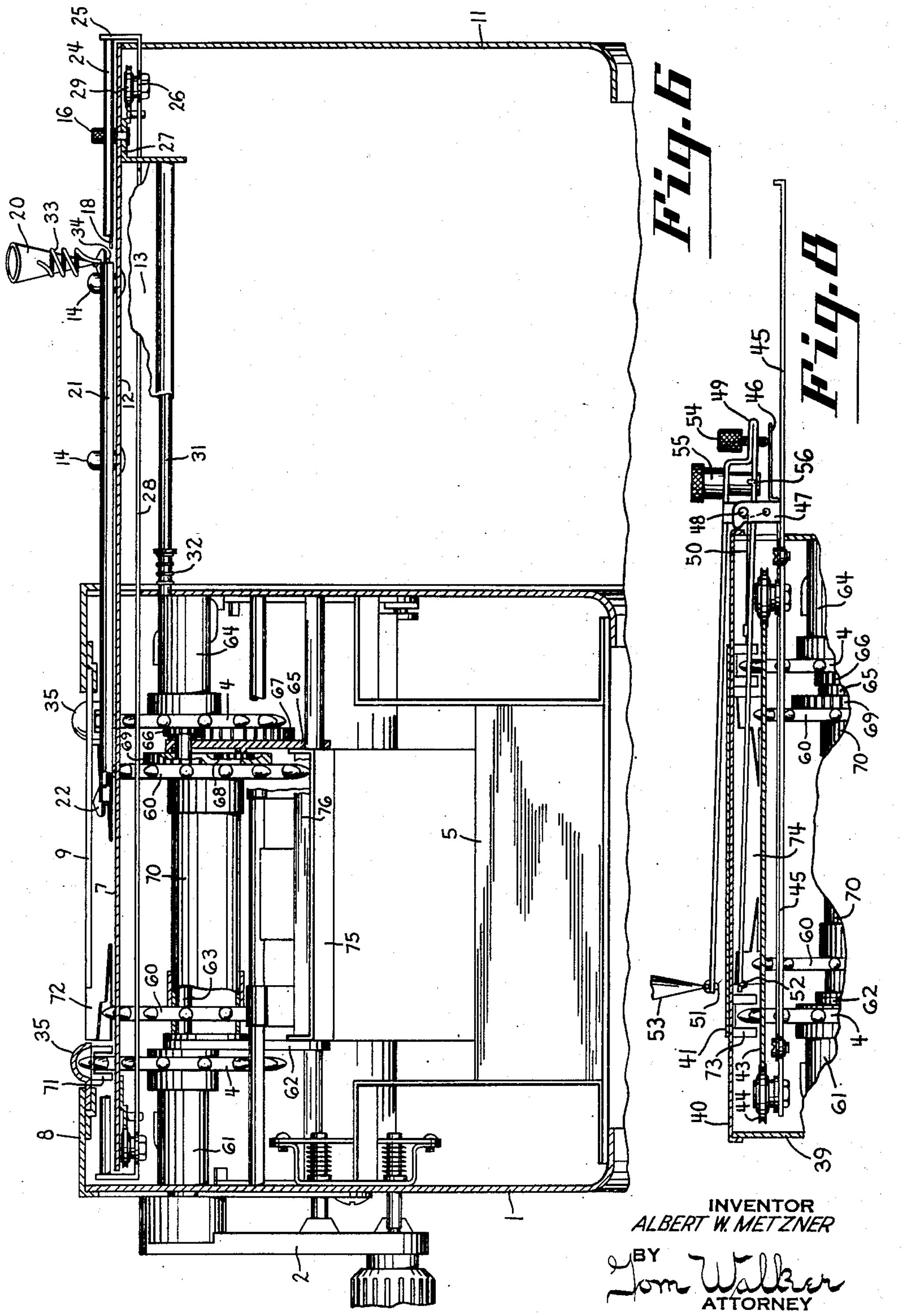
Fig. 6 is a rear sectional view taken on line 6—6 of Fig. 5.
Fig. 8 is a fragmentary rear sectional view taken on line 8—8 of Fig. 7.

There is shown in Figs. 5 and 6 a slight difference in the pen arrangement over that shown in Fig. 1, although the register construction is identical. Whereas Fig. 1 shows a pen unit within the register 1 having a self contained ink supply, or simply a stylus if the transparent record strip is used, Figs. 5 and 6 show a means to supply ink to the pen 23 from a remote reservoir, preferably contained within the manually held stylus 20. Within the stylus 20 a reservoir of ink is supplied which is transmitted to the pen 23 on the opposite end of the arm 21 through a flexible coiled tube 33 and a transversely extending tube 34 paralleling the interconnecting member 28 of the trolley 26.

So that the register mechanism and the assembly of superposed record strips therein may be completely housed and protected from weather and other adverse conditions, the pin wheels 4 are enclosed within embossed or raised dome portions 35 in the cover 8 or transparent insert 9.

Figure 7:
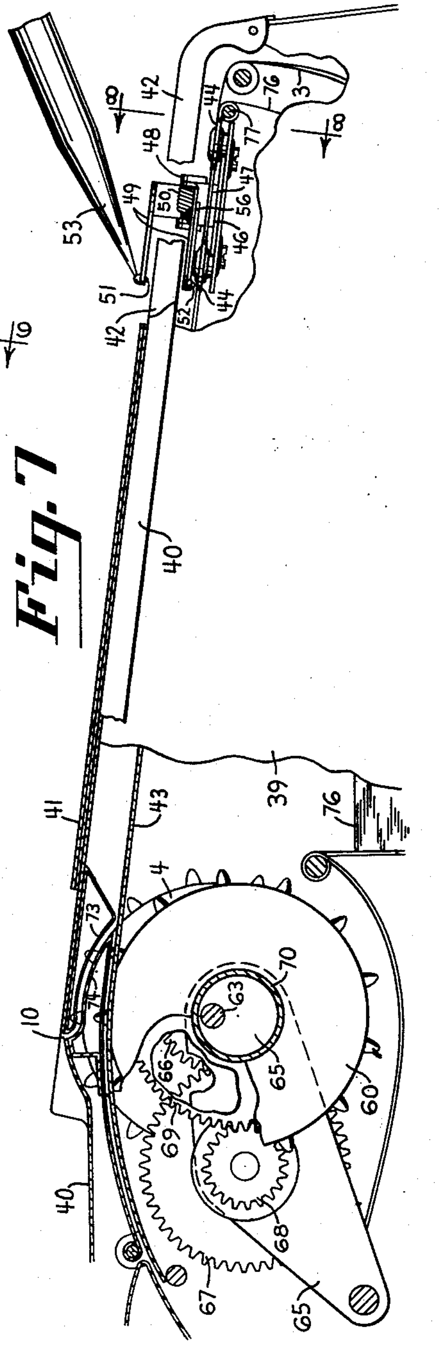
Fig. 7 is a fragmentary side view, partly in section of a register embodying a modified form of construction.

Figs. 7 and 8 show a modification of the foregoing structure in which the facsimile form 13 is placed on top of the cover 8 of the register cabinet 1, thereby eliminating the need for the laterally projecting supplemental cabinet 11. In this construction the register mechanism is enclosed within a cabinet 39 having an overlying lid 40 upon which the facsimile form 41 is supported in vertically spaced aligned relation with an underlying record form. The lid 40 may be either solid or provided with the transparent portion 9 of Fig. 1. In the event that a transparent portion is used, the facsimile form may be directly inscribed thereon, or the underlying record form may be used as a guide in inscribing the desired indicia. Thus, in effect there is provided a pair of vertically spaced writing tables upon each of which a form is supported to receive a written record.

Figure 2:
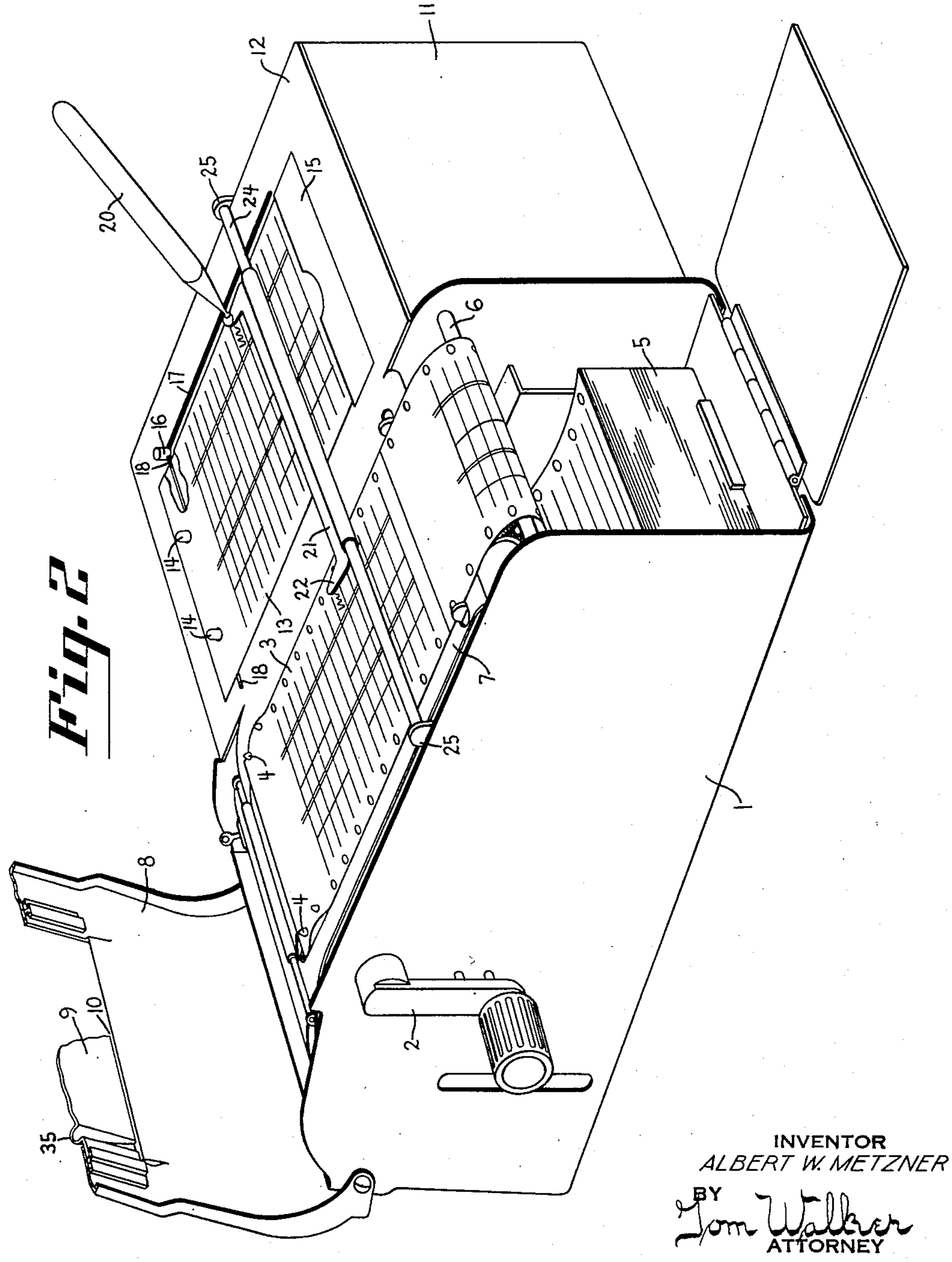
Fig. 2 is a view similar to Fig. 1 with the cover or enclosure members shown in open position.
Figure 3:
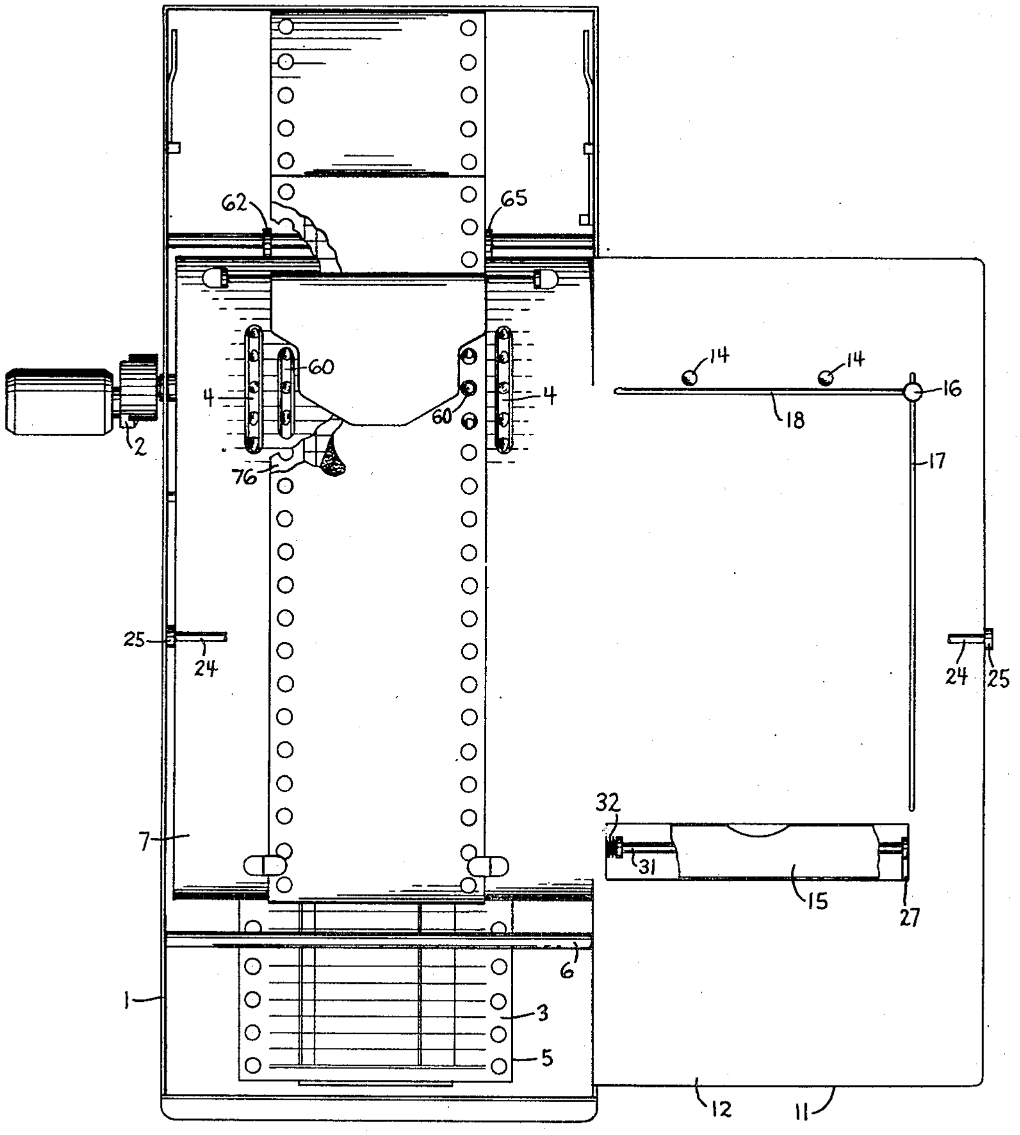
Fig. 3 is a top plan view of the register with the cover and uppermost forms removed.
Figure 4:
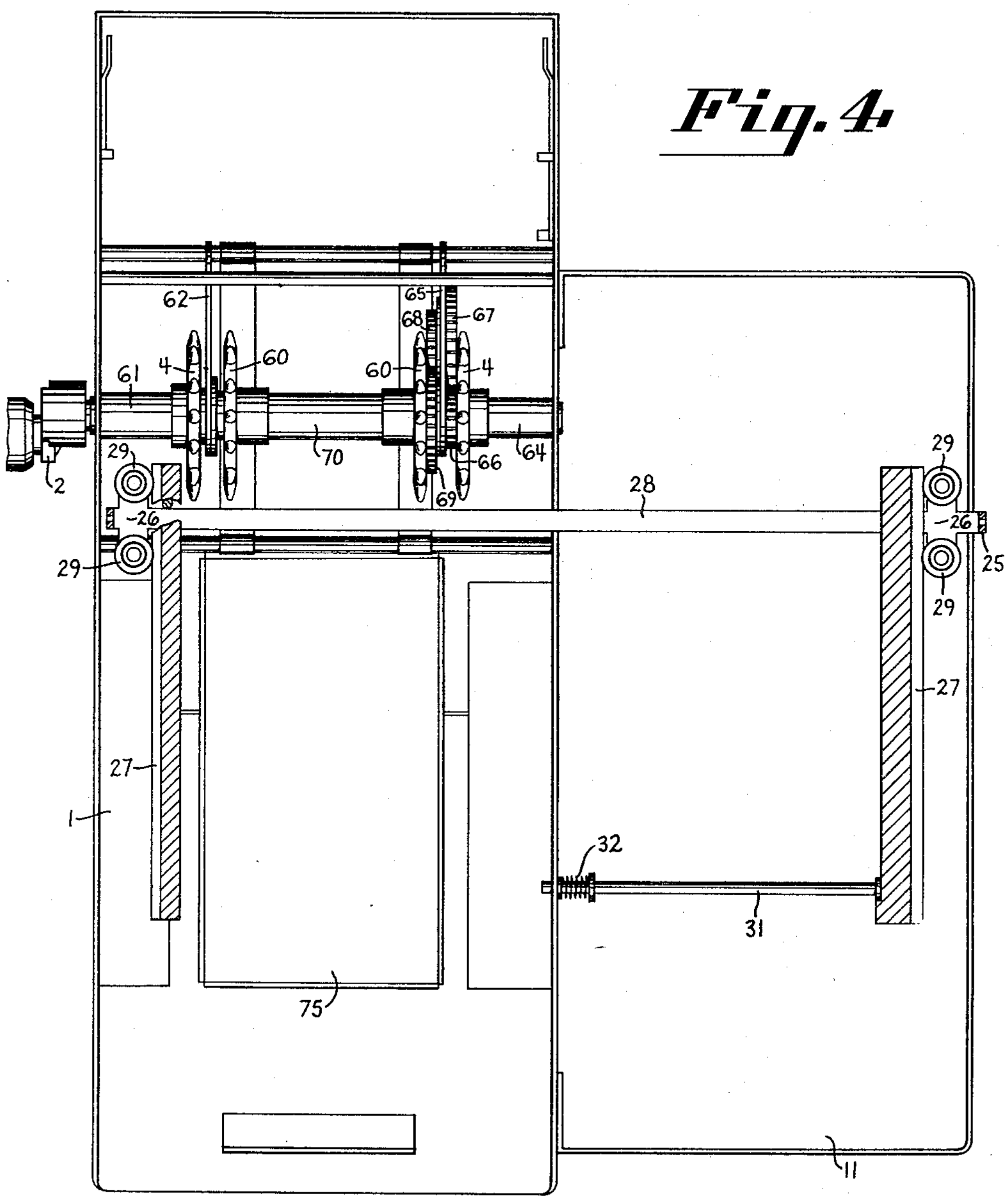
Fig. 4 is a top plan view, partly in section, with the writing tables removed.

Lid 40 is not quite as long as the cabinet 39 and a small separable piece 42 mounted on the rear of the cabinet completes the closure and affords a hand rest. Such construction is necessary in order to permit opening of lid 40 during the reloading of the register. During such operation the trolley upon which the writing instruments are carried is moved rearwardly into the area covered by the piece 42, thereby freeing lid 40 for oscillatory swinging movement about its pivot similar to the construction shown in Figs. 1 and 2.

In this instance the writing instruments are carried by a trolley quite similar to the former assembly except that it is mounted directly upon the edges of the underlying writing table 43 for longitudinal movement relative thereto. The roller units 44 of the trolley are connected by a transverse member 45 which extends outwardly from the side of the register (see Fig. 8) to support the pen carrying assembly in its movement transversely of the register and the form to be inscribed.

The pen carrying assembly includes a carrier 46 slidingly adjustable upon the transverse member 45, at one end of which carrier is located a pair of upstanding ears 47. Pivotally mounted at 48 to the ears 47 is a U-shaped pen carrying arm 49, normally urged in a clockwise direction about its pivot point (Fig. 8) by a coil spring 50 (Fig. 7). The tension of spring 50 normally tends to lift both the stylus 51 and the writing pen 52 from the underlying forms upon release of manual pressure upon the stylus 51 by release of the hand piece 53. The effect of such spring tension may be adjusted to suit the requirements of the operator by adjustment of a thrust member 54 carried by the arm 49 and bearing upon the carrier 46.

There is also shown in this construction a modified form of ink reservoir comprising a tank 55 mounted upon the end of arm 49 from which ink is supplied to the underlying pen 52 through conduit 56. This particular form of ink reservoir may be used with the construction shown in Figs. 1 to 6 with equal facility if desired.

A register or recording mechanism as disclosed herein has many applications. Not only are the record strips 3, including the original or first copy, fully enclosed thereby preventing unnecessary smudging and smearing by dirty hands of the operator, but such register may be used outdoors in all kinds of weather without injury to the forms therein. The opening 10 through which the original or topmost form of the assembly is ejected is of such proportion and so located that it is practically impossible for water to enter therethrough during periods of register operation.

In addition, a register of the present type quite effectively prevents tampering and alteration of the indicia recorded upon the superposed assembly of forms within the register. The register can be locked so that the forms are inaccessible until completion of the recording operation and ejection of the topmost form. At that time, however, the underlying copies of the indicia recorded on the original form have been advanced into a storage compartment and can no longer be altered. Nor can the original form be altered prior to ejection from the register without simultaneously altering the underlying copies.

Should it be necessary or desirable to make a permanent record upon the facsimile form 13, an individual form corresponding to those within the register may be substituted for the "Magic Slate" type of facsimile form. In such case, if a transparent form with an underlying upwardly facing transfer sheet be used no change in the stylus is necessary. If it is desirable, however, to complete the facsimile form with ink, a ball point pen may be substituted for the stylus, and ink supplied thereto either from the hand piece or from the separate reservoir in the same manner as ink is supplied to the underlying writing pen.

It is also possible to provide a complete set of superposed strips of series connected detachable forms in place of the facsimile form 13. To accomplish this it is only necessary to insert an additional strip feeding mechanism engageable with the extra set of strips and actuated simultaneously with the pin wheels 4 by the hand crank 2. (See Fig. 9.)

There is shown in the present disclosure a dual type feeding mechanism which permits the use of an underlying tally sheet if so desired. Such underlying tally sheet is advanced during each operation of the strip feeding mechanism, and is usually of lesser width and length than the uppermost record sheet.

The simultaneous feed of the tally or underlying strip is accomplished simultaneously with the advancement of the uppermost strip by means of pin wheels 60 driven in timed relation with the main pin wheels 4 through intermediate gearing. As shown in Figs. 4 to 7, inclusive, the hand crank 2 is secured to a tubular shaft 61 journaled in the side frame of the register. The opposite end of shaft 61 is journaled in an intermediate supporting plate 62. Pin wheel unit 4 is carried by the shaft 61 for unison rotation therewith throughout one complete rotation under influence of the crank 2. Centrally disposed within the shaft 61 and secured thereto for unison rotation is a smaller shaft 63 which extends transversely of the register, the opposite end being supported in tubular shaft 64 corresponding to shaft 61 and supported in the side frame and cooperating intermediate plate 65. The opposite shaft 64 carries the opposite pin wheel 4, both sides of the main feed comprising the pin wheels 4 being rotated in unison through the shaft 63.

Mounted adjacent the outboard pin wheel 4 on shaft 64 for unison rotation therewith is a gear 66 which meshes with gear 67 pivotally mounted upon the intermediate plate 65. Mounted coaxially with gear 67 upon the opposite side of plate 65 is a second idler gear 68 meshing with gear 69 carried by the outboard pin wheel 60 of the summary feed mechanism. Pin wheels 60 are mounted upon a tubular shaft 70 and fixed relative thereto for unison rotation, shaft 70 being supported upon the spaced intermediate plates 62—65.

By appropriate choice of gear ratios, the summary feed may be made to advance any desired distance relative to the advancement of the uppermost record sheet engageable with pin wheels 4. As shown in Figs. 5, 6, 7 and 8, the main pin wheels 4 are slightly elevated to the summary strip pin wheels 60, although the uppermost record strip and underlying strips are advanced over the writing table in a substantially common plane so that the indicia recorded upon the uppermost strip will be transferred onto the underlying strips.

The record strip is held down and in engagement with the pin wheels 4 by means of a feed finger 71 (Fig. 5) and is curled upward for ejection from the register by a second guide or finger 72. In Fig. 7 there is shown a slight modification of the feed finger arrangement embodying a single finger 73 which partially extends about the periphery of the pin wheel. Cooperating with the finger 73 (Fig. 7) is an underlying support 74 which curls the record strip upward for ejection from the register, while also serving as a hold down or feed finger for maintaining the underlying strips in engagement with the secondary feed pin wheels 60.

When the underlying record sheets are differentially fed relative to the uppermost record sheet, a supply of the underlying sheets is supported upon a shelf 75 located in spaced relation above the supply 5 of record sheets from which the underlying sheets 76 are advanced about a guide roller 77.

Should it be desired to provide feeding means in the supplemental cabinet 11, an additional set of pin wheels 78 (Fig. 9) are mounted upon a shaft 79, the outer end of which is journaled in the outside frame of the supplemental cabinet. Shafts 63 and 64 are projected through the side frame of the main cabinet, shaft 64 providing a support for one end of a supplemental support plate 80, while shaft 63 strengthens the supplemental pin wheel shaft 79. Mounted upon shaft 64 is a gear 81 which through gears 82 and 83, rotatably supported upon plate 80, drives gear 84 carried by pin wheel 78 and shaft 79. The gear ratios are such that the pin wheels 78 make one complete revolution at the same speed as the pin wheels 4 mounted on shafts 61 and 64.

With such additional pin wheels in the supplemental cabinet, additional superposed record forms may be progressively advanced over the supplemental cabinet, the supply of forms being stored immediately below the writing table within the cabinet.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An autographic register mechanism including spaced writing tables upon which pre-printed record receiving forms are located in predetermined relation relative to one another, spaced writing instruments associated with said writing tables, and means for moving said writing instruments in unison through identical paths of travel, including a trolley member supported beneath said writing tables for longitudinal movement relative thereto, a carrier bar mounted upon said trolley for unison movement therewith, and a writing instrument carrier pivotally supported upon said carrier bar and capable of sliding movement longitudinally of the trolley unit transversely of the writing tables.

2. An autographic register mechanism including multiple writing units for simultaneously recording upon associated record receiving forms the desired indicia, a writting table for each writing unit, a mounting for the multiple writing units supported by the writing tables in dependent underlying relation thereto and movable longitudinally thereof, a carrier upon which the writing units are supported, said carrier being pivotally supported upon the mounting, means for moving said carrier transversely of the writing table upon said mounting, the construction and arrangement being such that the multiple writing units are simultaneously movable through identical paths of travel both transversely and longitudinally of the register mechanism, and means for locating the multiple record receiving forms in predetermined relative positions so that indicia inscribed at a predetermined point on one record receiving form will be inscribed at the same predetermined point on the other record receiving forms.

3. An autographic register including a cabinet, spaced writing tables therein upon which record receiving forms are positioned in predetermined relation, form locating means therefor, a first writing instrument overlying one of said writing tables, a second writing instrument overlying another of said writing tables, a pivotally mounted support for said writing instruments, the construction and arrangement being such that the writing instruments may be simultaneously raised and lowered relative to their associated writing tables, a carrier for said pivotal support upon which said support is free for sliding movement transversely of the associated writing tables, and a movable mounting for said carrier, the mounting being movable longitudinally of the writing tables and supported thereby in dependent underlying relation, the construction and arrangement being such that the writing instruments are simultaneously movable both transversely and longitudinally of their respective writing tables.

4. An autographic register mechanism including an inscription receiving area, an inscription receiving form located in predetermined relation therewith, a support for said form comprising a table, and form inscribing means comprising a part of the register mechanism and substantially universally movable over the entire inscription receiving area including a trolley member supported upon the edges of the table for sliding movement therealong and extending in underlying relation therewith, a carrier slidingly movable longitudinally of the trolley member simultaneously with its movement along the edges of the table in unison with movement of the trolley, and an inscribing instrument pivotally mounted upon the carrier for movement toward and away from the table simultaneously with its movement thereover in unison with the movement of the carrier and trolley.

5. An autographic register mechanism including an inscription receiving area, an inscription receiving form located in predetermined relation therewith, a support for said form comprising a writing table, and a writing instrument movably supported upon opposite edges of the writing table for substantially universal movement thereover including sliding supports therefor respectively movable longitudinally and transversely of the writing table, said supports being an integrated part of the register mechanism located in dependent relation to the writing table.

6. An autographic register, including a cabinet structure presenting a pair of writing tables in relatively fixed, side-by-side relation, preprinted forms on said tables in laterally aligned relation to one another, a bar extending in transverse overlying relation to said tables, trolley means in dependent underlying relation to the pair of writing tables mounting said bar for motion to and fro longitudinally of said tables, a carrier member mounted on said bar for relative rotary and longitudinal sliding movements, and a pair of writing instruments on said carrier member each extending into cooperative relation respectively with the record form on one of said tables, at least one of said instruments including a handle portion for the grasp of the operator or recorder.

7. An autographic register according to claim 6, characterized by a lid member adjustable to cover one of said tables, said bar and carrier member being received between said lid and the said one table so that the writing instrument associated with said one table likewise is covered by said lid.

8. An autographic register mechanism including a cabinet, a writing table totally enclosed within the cabinet upon which a record receiving form is positioned to receive a written record thereon, a writing instrument totally enclosed within the cabinet and movable over the positioned record receiving form to produce thereon a written record, the construction and arrangement being such that the record form and writing instrument are protected from weather and other abuse by their complete enclosure within the cabinet, and means for producing a written record upon the enclosed form including a writing instrument mounted exteriorly of the cabinet, a facsimile record receiving form mounted exteriorly of the cabinet in aligned relation with the previously positioned enclosed record receiving form, mounting means movable longitudinally on the writing table, a carrier movable on said mounting means transversely of said mounting means and said writing table, said writing instruments mounted on said carrier, whereby movements of the exterior instrument over the facsimile form will be reproduced by the enclosed writing instrument over the enclosed record form.

References Cited in the file of this patent

UNITED STATES PATENTS

| Number | Name | Date |
|---|---|---|
| 615,022 | Hoff | Nov. 29, 1898 |
| 651,903 | Tschinkel | June 19, 1900 |
| 747,687 | Davis | Dec. 22, 1903 |
| 773,151 | Latimer | Oct. 25, 1904 |
| 940,730 | Roovers | Nov. 23, 1909 |
| 1,512,015 | Butz et al. | Oct. 21, 1924 |
| 2,057,820 | Corwin | Oct. 20, 1936 |
| 2,068,166 | Dodge | Jan. 19, 1937 |
| 2,575,606 | Wales et al. | Nov. 20, 1951 |